(12) United States Patent
Wallmeier et al.

(10) Patent No.: US 11,982,304 B2
(45) Date of Patent: May 14, 2024

(54) FASTENING ELEMENT

(71) Applicant: KAMAX Holding GmbH & Co. KG, Homberg (DE)

(72) Inventors: Stefan Wallmeier, Goldbach (DE); Frank Wagner, Buseck (DE)

(73) Assignee: KAMAX Holding GmbH & Co. KG, Homberg (DE)

( * ) Notice: Subject to any disclaimer, the term of this patent is extended or adjusted under 35 U.S.C. 154(b) by 235 days.

(21) Appl. No.: 17/624,952

(22) PCT Filed: Jul. 22, 2020

(86) PCT No.: PCT/EP2020/070629
§ 371 (c)(1),
(2) Date: Jan. 5, 2022

(87) PCT Pub. No.: WO2021/018678
PCT Pub. Date: Feb. 4, 2021

(65) Prior Publication Data
US 2022/0364590 A1    Nov. 17, 2022

(30) Foreign Application Priority Data
Jul. 29, 2019  (DE) .................... 10 2019 120 362.7

(51) Int. Cl.
*F16B 35/02* (2006.01)
*F16B 33/02* (2006.01)

(52) U.S. Cl.
CPC .................... *F16B 33/02* (2013.01)

(58) Field of Classification Search
CPC .............................. F16L 27/0804; F16B 33/02
(Continued)

(56) References Cited

U.S. PATENT DOCUMENTS 4,856,620 A * 8/1989 Thiel ................... F16D 65/0978
188/73.39
5,562,187 A * 10/1996 Tribuzio ........... F16D 55/22655
188/73.35
(Continued)

FOREIGN PATENT DOCUMENTS

DE    10203133 C1    10/2003
DE    10258149 A1     7/2004
(Continued)

OTHER PUBLICATIONS

Tschaetsch, Heinz, "Metal Forming Practise", Springhill, 2005, (pp. 1-8, Chpt. 6—2 Pages) Partial English Translation attached.
(Continued)

*Primary Examiner* — Gary W Estremsky
(74) *Attorney, Agent, or Firm* — Bodman PLC

(57) ABSTRACT

Fastening element (1), in particular mounting bolt, comprising a fixing portion (10), an intermediate portion (20) and a fitting portion (30), wherein the fastening element (1) extends along a longitudinal axis (L), wherein the fixing portion (10) comprises fixing structures, in particular a thread, wherein the intermediate portion (20) is arranged in the direction of the longitudinal axis (L) between the fixing portion (10) and the fitting portion (30), wherein the fitting portion (30) is substantially rotationally symmetrical about the longitudinal axis (L), wherein the fitting portion (30) has an outer support surface (34), wherein the support surface (34) has a clearance fit, and wherein at least in the fitting portion (30) a lubrication groove (32) is provided.

14 Claims, 3 Drawing Sheets

Figure 1:
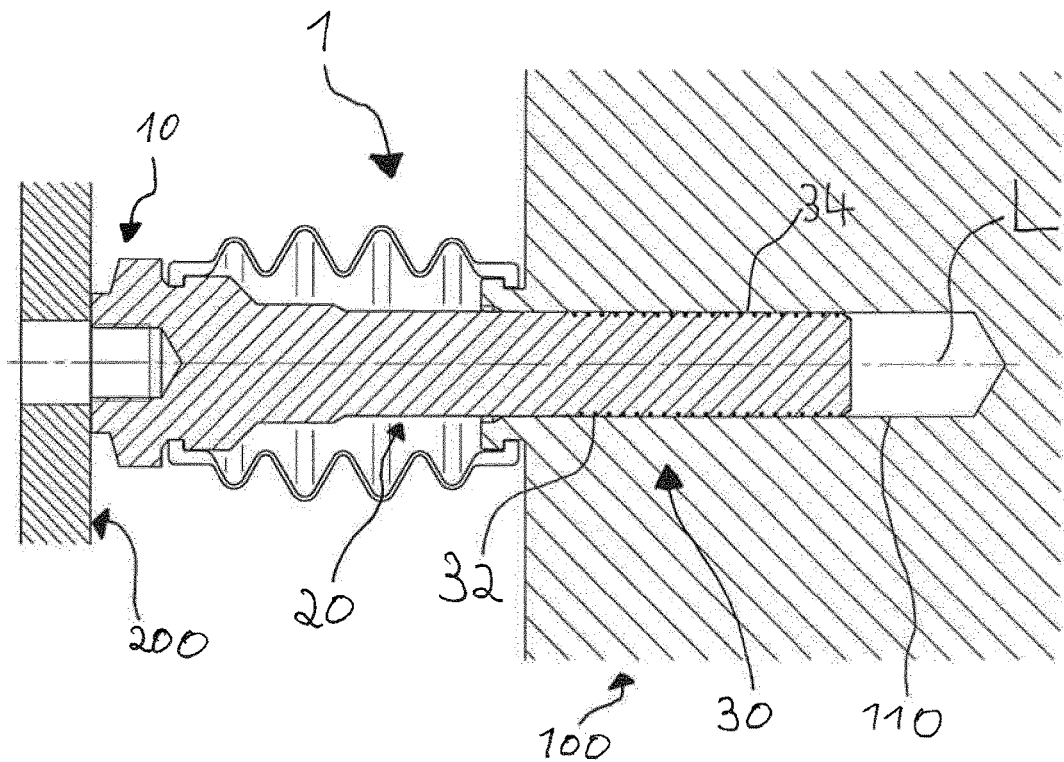

(58) Field of Classification Search
USPC .......................................................... 411/383
See application file for complete search history.

(56) References Cited

U.S. PATENT DOCUMENTS

| | | | | |
|---|---|---|---|---|
| D433,621 | S * | 11/2000 | Wiley | D8/387 |
| 8,051,958 | B1 * | 11/2011 | Rockwell | F16D 55/227 |
| | | | | 188/73.45 |
| 9,284,999 | B2 * | 3/2016 | Gerber | F16D 55/22655 |
| 9,394,954 | B2 * | 7/2016 | Smith | F16D 65/0087 |
| 9,587,686 | B2 * | 3/2017 | Morais | F16D 55/227 |
| 9,850,967 | B2 * | 12/2017 | Gerber | F16D 55/22655 |
| 9,951,832 | B2 * | 4/2018 | Crippa | F16D 55/227 |
| 10,677,299 | B2 * | 6/2020 | Kelvin | F16D 65/0087 |
| 10,781,872 | B2 * | 9/2020 | Jedele | F16D 55/227 |
| 2006/0049007 | A1 * | 3/2006 | Tomita et al. | F16B 37/085 |
| 2013/0133990 | A1 * | 5/2013 | Suzuki | F16D 55/227 |
| | | | | 188/73.39 |

FOREIGN PATENT DOCUMENTS

| | | |
|---|---|---|
| EP | 1126191 A2 | 8/2001 |
| EP | 3412923 A1 | 12/2018 |
| FR | 2771149 A1 | 5/1999 |
| JP | 2002310204 A | 10/2002 |
| KR | 20070036281 A | 4/2007 |
| WO | 2006096108 A1 | 9/2006 |

OTHER PUBLICATIONS

Screen print from The Wayback Machine—https://web.archive.org/web/20180508090458/http://www.gewindesichern.de:80/schmieren, downloaded Mar. 29, 2022.

International Search Report in co-pending, related PCT Application No. PCT/EP2020/070629, dated Mar. 15, 2021.

International Preliminary Report of Patentability in related PCT Application No. PCT/EP2020/070629 dated Dec. 17, 2021.

* cited by examiner

FASTENING ELEMENT

CROSS REFERENCE TO RELATED APPLICATIONS

This application is the 35 U.S.C. § 371 national stage application of PCT Application No. PCT/EP2020/070629, filed Jul. 22, 2020, which application claims the benefit of German No. DE 102019120362.7, filed Jul. 29, 2019, both of which are hereby incorporated by reference herein in their entireties.

The invention relates to a fastening element, in particular a clearance fit fastening element.

Fastening elements are already known from the prior art. These elements serve to connect two components with each other in such a way that forces can be transmitted from one component to the other. Frequently, these fastening elements are designed in such a way that the components to be fastened are movable relative to each other. This is achieved in particular by providing a clearance fit between an element to be fastened and the fastening element. However, it is often the case—especially when the element to be fastened is guided precisely—that a certain sluggishness may be present between the components to be fastened and the fastening element, in particular due to the ingress of corrosion and/or due to the friction that occurs.

It is therefore the object of the invention to provide a fastening means which permits easy movement.

This object is achieved with a mounting element according to claim 1, with a mounting system according to claim 8 and with a manufacturing method according to claim 9.

According to the invention, a fastening element, in particular a mounting bolt, comprises a fixing portion, an intermediate portion and a fitting portion, wherein the fastening element extends along a longitudinal axis, wherein the fixing portion comprises fixing structures, in particular a thread, wherein the intermediate portion is arranged in the direction of the longitudinal axis between the fixing portion and the fitting portion, wherein the fitting portion is substantially rotationally symmetrical about the longitudinal axis, and wherein the fitting portion has an outer support surface, wherein the support surface has a clearance fit, and wherein at least one lubrication groove is provided at least in the fitting portion. In particular, the fastening element according to the invention serves to connect a mounting part to a fixing part in such a way that these are movable relative to one another along the longitudinal axis, but forces perpendicular to this longitudinal axis or axis of movement can be absorbed or transmitted by the fastening element. In other words, the fastening element according to the invention can serve to enable fastening, wherein movement—at least to a certain extent—in the direction of the longitudinal axis of the fastening element is possible between the parts to be fastened (mounting part and fixing part). The longitudinal axis of the fastening element is thereby the axis in which the fastening element mainly extends. In other words, the longitudinal axis is in particular the axis in which the length of the fastening element is determined. The fastening element comprises at least a fixing portion, an intermediate portion and a fitting portion. The fixing portion serves to connect the fastening element to a fixing part, for example in a form-fitting manner. Advantageously, this connection is made in such a way that no relative movement is possible between the fixing part and the fixing portion of the fastening element—in a mounted state. In order to achieve this fixing, the fixing portion has, in particular, fixing structures. Therein, these fixing structures may be formed, for example, by an external thread. Alternatively or additionally preferably, these fixing structures may also be formed by an internal thread. However, fixing structures are generally understood to mean any structures which enable the fixing portion of the fastening element to be firmly connected to a fixing part. For example, such a fixing structure may also be formed by a forming process, such as by beading parts of the fixing portion. Between the fixing portion and the fitting portion—seen in the direction of the longitudinal axis—is the intermediate portion of the fastening element. Advantageously, the intermediate portion is at least partially rotationally symmetrical about the longitudinal axis. For example, the intermediate portion may be at least partially conical and/or cylindrical in shape so as to bring about a change in geometry in the direction of the longitudinal axis. This may serve, for example, to provide a smooth transition of the outer dimension between the fixing portion and the fitting portion in order to achieve a mechanically loadable fastening element. Therein, in particular, the intermediate region is configured to taper from the fixing portion to the fitting portion. This takes into account the primarily occurring bending stress along the longitudinal axes, so that material can be saved, while at the same time providing sufficient bending stiffness or bending strength of the fastening element. In particular, the fitting portion of the fastening element serves to interact with a mounting part in an indirectly or directly contacting manner. In this regard, the fitting portion is such that it has an outer support surface adapted to contact indirectly or directly with the mounting part. In order to achieve movability along the longitudinal axis between the fastening element and the mounting part, the support surface is configured to have a clearance fit, in particular in relation to the surfaces of the mounting part that may surround and/or contact the fitting portion of the fastening element in a mounted condition. For example, the fit of the fitting portion can be designed such that it can be found in the tolerance classes IT4 to IT11 according to DIN ISO 286-1. Therein, the fitting portion is formed substantially rotationally symmetrical about the longitudinal axis. By "substantially rotationally symmetrical" it is to be understood that the basic shape of the fitting portion, in particular the support surface(s) of the fitting portion, is formed rotationally symmetrically about the longitudinal axis, for example at least partially conical or cylindrical or trilobular or pentilobular. In this regard, the fitting portion is in particular substantially rotationally symmetrical, if the support surface of the fitting portion is trilobular calibrated and has an outer diameter tolerance of ≤30 µm and a trilobularity of 10 µm to 100 µm. Alternatively preferred or additionally preferred, the fitting portion may also be substantially rotationally symmetrical if the support surface(s) of the fitting portion, has (have) a pentilobular calibrated support surface having an outer diameter tolerance of ≤30 µm and a defined out-of-roundness of 10 µm to 100 µm. However, this basic rotational symmetry of the fitting portion, in particular the support surface(s) of the fitting portion, may be destroyed, in particular by lubrication grooves or depressions running towards the lubrication grooves, without violating a "substantially rotationally symmetrical" fitting portion. In other words, this may mean that the fitting portion may be fundamentally cylindrical, conical or barrel-shaped, wherein into this ideal rotationally symmetrical shape—about the longitudinal axis—for example one/more lubrication groove(s) or lubrication helix(es), may be introduced without destroying the substantially rotationally symmetrical shape of the fitting portion. In the fitting portion according to the invention, one or more lubrication grooves are introduced into the support surface, which, as already explained, may disturb the rotationally symmetrical shape of the fitting portion. The lubrication groove or grooves serve to be able to receive lubricants and to enable lubricant to be introduced into the contacting region of the fitting portion, in particular onto the support surface. In particular, this achieves a reduction in the coefficient of friction, so that the fastening element according to the invention is able to achieve easy assembly between the fastening element and the mounting part. In addition, corrosion, in particular due to the fit, can thereby also be prevented or made more difficult in the long term, so that a "smooth running" of the clearance fit can also be maintained over a long period of time. The lubrication groove(s) in the fitting portion can be formed rotationally symmetrically about the longitudinal axis. For example, this is possible with a self-contained and annular design of the lubrication grooves. Alternatively preferred or additionally preferred, the lubrication groove or all lubrication grooves may also be configured such that they completely penetrate(s) the fitting portion in the direction of the longitudinal axis or extend(s) completely through/over the fitting portion in the longitudinal direction. This may be the case, for example, if the lubrication groove(s) extends(s) along the longitudinal axis over the entire fitting portion. For example, by a lubrication groove having a rectilinear configuration. By extending the lubrication groove or at least some lubrication grooves along the entire fitting portion in the direction of the longitudinal axis, an external addition of lubricant can also be made possible in the assembly state, and furthermore or alternatively, a reliable lubrication of the entire fitting portion in the direction of the longitudinal axis can also be achieved thereby.

Advantageously, a lubricant is introduced into the lubrication groove or grooves. In a preferred embodiment, different lubricants are introduced into at least two different lubrication grooves. In this way, the lubricant in the respective lubrication grooves can be adapted to the existing tribological load profile of the respective groove.

Expediently, at least one lubrication groove, in particular all lubrication grooves, is designed and/or formed in such a way that during a movement of the fastening element in the direction of the longitudinal axis, the support surface can be wetted with lubricant through the lubrication groove. In other words, this may mean that the lubrication groove may be shaped and/or arranged such that the support surface is wettable with lubricant therethrough—both in the direction circumferentially about the longitudinal axis and in the direction of the longitudinal axis. Therein, this wettability can take place directly or indirectly in interaction, for example, with a receptacle of a mounting part. In other words, therefore, the lubrication groove may be arranged and/or formed such that it can convey or transport the lubricant to any location on the support surface when the fastening element is moved in the direction of the longitudinal axis. In this regard, however, it may be necessary that such lubricant conveyance and/or transport is not enabled by the lubrication groove alone, but rather requires a contact partner for this purpose, such as a receptacle of a mounting part, which interacts with the lubrication groove. For example, such a lubrication groove can be achieved by the lubrication groove being formed as a lubrication helix.

Advantageously, at least one lubrication groove, in particular all lubrication grooves, is a lubrication helix. By a lubrication helix it is to be understood that the lubrication groove is introduced into the fitting portion in a helical manner. In other words, the lubrication helix may be configured similarly to a thread. By providing at least one lubrication helix, a particularly homogeneous and good distribution of the lubricant—both along the longitudinal direction and along the circumferential direction—is achieved.

The lubrication groove, in particular the lubrication helix, expediently has a pitch in the direction of the longitudinal axis, wherein the pitch of the lubrication groove to the diameter of the support surface is in a range from 0.03 to 0.4, preferably in a range of 0.05 to 0.3 and more preferably in a range of 0.075 to 0.2. The stated ratios refer in particular to a single-start or a multi-start lubrication helix. If the lubrication helix or the lubrication helices are designed to be multi-start with respect to one another, the ratio is advantageously to be multiplied by the number of starts.

In particular, the pitch of the lubrication groove is the distance between two adjacent flanks of the same lubrication groove or the same lubrication helix in the direction of the longitudinal axis. In other words, this may mean that the pitch of the lubrication groove is that distance which the lubrication groove has to itself in the direction of the longitudinal direction after one revolution about the longitudinal direction. At a ratio in the range of 0.03 to 0.4, a particularly high load-bearing capacity of the support surface can be achieved. At a ratio in the range of 0.05 to 0.3, the applicant has surprisingly found that such a support surface or lubrication groove can be made particularly easily. At a ratio in the range of 0.075 to 0.2, the applicant has found that a particularly homogeneous distribution of lubricant in the lubrication gap can be achieved.

Alternatively or additionally preferably, the distance in the direction of the longitudinal axis of two adjacent lubrication grooves to the diameter of the support surface is in a range of 0.03 to 0.4, preferably in a range of 0.05 to 0.3 and more preferably in a range of 0.075 to 0.2. At a ratio in the range of 0.03 to 0.4, a particularly high load-bearing capacity of the support surface can be achieved. At a ratio in the range of 0.05 to 0.3, the applicant has surprisingly found that such a support surface or lubrication groove can be made particularly easily. At a ratio in the range of 0.075 to 0.2, the applicant has found that a particularly homogeneous distribution of lubricant in the lubrication gap can be achieved.

Preferably, the, in particular averaged, width of the lubrication grooves in the direction of the longitudinal axis to the pitch of the lubrication groove is in a range of 0.003 to 0.1, preferably in a range of 0.005 to 0.05 and more preferably in a range of 0.009 to 0.03. At a ratio of 0.003 to 0.1, a particularly high load-bearing capacity of the support surface can be achieved. At a ratio in the range of 0.05 to 0.5, the applicant has surprisingly found that such a lubrication groove can be made particularly easily. At a ratio in the range of 0.009 to 0.03, the applicant has found that a particularly homogeneous distribution of lubricant in the lubrication gap can be achieved. Advantageously, the governing width of the lubrication grooves in the direction of the longitudinal axis is the averaged maximum width of the lubrication grooves in a sectional plane containing the longitudinal axis. In other words, the governing sectional plane may therefore be a longitudinal sectional plane.

Alternatively or additionally preferably, the, in particular averaged, width of the lubrication grooves in the direction of the longitudinal axis to the distance between two adjacent lubrication grooves in the direction of the longitudinal axis is in a range of 0.003 to 0.1, preferably in a range of 0.005 to 0.05 and more preferably in a range of 0.009 to 0.03. The distance between two adjacent lubrication grooves in the direction of the longitudinal axis can thereby designate not only the distance to another lubrication groove but also the distance of a lubrication groove to itself in the direction of the longitudinal axis. In other words, for a single lubrication groove, this distance may therefore correspond to the pitch of the lubrication groove. In particular, the distance in the direction of the longitudinal axis of two adjacent lubrication grooves is the distance between the centre lines of the lubrication grooves on the support surface in a longitudinal section. At a ratio in the range of 0.003 to 0.1, a particularly high load-bearing capacity of the support surface can be achieved. At a ratio in the range of 0.005 to 0.05, the applicant has surprisingly found that such a lubrication groove can be made particularly easily. At a ratio in the range of 0.009 to 0.03, the applicant has found that a particularly homogeneous distribution of lubricant in the lubrication gap can be achieved.

The fastening element is expediently formed in one piece. In this way, a particularly loadable fastening element can be achieved. By one piece it is to be understood that the fastening means itself is made from a base body and/or blank. Therefore, the best fastening means is in particular not formed by several, for example, materially joined, components.

Advantageously, the fastening element is designed as a guiding element. In other words, this may mean that the fastening means serves to guide a component, in particular in the direction of the longitudinal axis.

Expediently, the support surface is threadless. A "threadless" design is understood to mean that the support surface does not have a thread. This can reduce the notch effect in the support surface, so that the load capacity of the fastening element can be increased.

In an advantageous embodiment, the fitting portion has a plurality of lubrication helices, wherein in particular the fitting portion has 3 to 20 lubrication helices. The fitting portion may have several lubrication helices, similar to a thread, wherein the lubrication helices may be multi-start with respect to each other. Therefore, the fitting portion may have multi-start lubrication helices similar to a multi-start thread. By providing a plurality of lubrication helices, a particularly simple distribution of the lubricant can be achieved, in particular also because by providing a plurality of lubrication helices its pitch can be selected to be particularly large. In this way, the length of the individual lubrication helix can be reduced, so that even highly viscous lubricants can be efficiently introduced into the helix. Particularly preferably, the fitting portion has 3 to 20 lubrication helices. Through this, a particularly simple tracking of lubricant can be achieved. In other words, by providing 3 to 20 lubrication helices, it can be achieved that lubricant can be easily fed into the clearance fitting gap to be lubricated between the support surface and a receptacle of the mounting part even after commissioning or after mounting of the fastening element. This circumstance makes it possible to renew the lubricant, in particular without dismantling the fastening element.

Advantageously, the support surface is cylindrical about the longitudinal axis. A support surface is cylindrical in particular if the support surface is all arranged between two imaginary cylinders which have a diameter difference of 30 to a maximum of 100 μm, and wherein in particular the axis of symmetry of these two imaginary cylinders lie on the longitudinal axis. Due to the cylindrical design of the support surface, a particularly homogeneous stress distribution is achieved, so that the fastening element can safely absorb high transverse forces. Advantageously, this cylindrical design of the support surface can be created or achieved in particular by calibrating the raw profile in a subsequent manufacturing step, in particular by rolling.

Preferably, the cross-section of the lubrication groove has an opening facing in a radial direction and a bottom portion, wherein the bottom portion is in particular rounded. The relevant cross-section for this determination is the cross-section of the lubrication groove perpendicular to the running direction of the lubrication groove. In particular, the opening of the lubrication groove is configured to create a contour on the support surfaces. In other words, this may mean that in particular the opening forms the radial outwardly facing ends of the lubrication groove. The radial direction in this case is the direction which points radially away from the longitudinal axis. The bottom portion of the lubrication groove is that portion of the same which connects the two flanks of the lubrication groove to each other. The bottom portion is in particular formed by a rounding. This rounded bottom portion results in a particularly simple manufacture of the bottom portion and, in addition, a particularly low notch effect and thus a particularly high degree of strength can be achieved. Advantageously, the ratio of the rounded diameter of the rounded bottom portion to the outer diameter of the support surface of the fitting portion is in a range of 0.025 to 0.05. Such a design results in a particularly mechanically strong thread with a low notch effect. In particular, the rounding of the bottom portion is such that this rounding is greater than a rounding of a comparable metric thread.

In a preferred further development, the opening, in particular in the direction of the longitudinal axis, has a smaller extension than the bottom portion. In other words, this may mean that the lubrication groove is designed such that it tapers towards the opening. Therefore, the lubrication groove may be designed such that in particular those parts of the groove between the bottom portion and the opening are tapered towards the opening. By this tapering, a controlled lubricant outlet can be achieved. In particular, this tapering part retains part of the lubricant, so that a particularly homogeneous lubricant discharge is achieved along the extension of the lubrication groove.

In a preferred embodiment, the cross-section of the lubrication groove has an arrow-shaped connecting portion, the arrow-shaped connecting portion being tapered in the direction of the radial direction. The connecting portion is that part or those lateral parts of the cross-section of the lubrication groove which connects the bottom portion to the opening. Therein, in particular, the cross-section is formed straight in this connecting portion. By arrow-shaped it is to be understood in this context that theoretically the two connecting portions, which are in particular leg-shaped, are formed in such a way that these parts or legs of the connecting portion would theoretically intersect outside the fastening element. In other words, the connecting portion may be formed at least partially v-shaped, wherein the (imaginary) intersection point of the two v-shaped legs would be located outside the fastening element in radial direction. This type of design of the connecting portion is in particular particularly easy to manufacture, thereby resulting in a low-cost fastening element.

In a preferred further development, the opening angle of the arrow-shaped connecting portion has an angle in the range of 10° to 70°, preferably in a range of 20° to 60° and more preferably in a range of 30° to 50°. The opening angle is the angle formed between the arrow-shaped legs of the connecting portion. An opening angle in the range of 10° to 70° results in a lubrication groove which is particularly easy to produce, so that a low-cost fastening element results. With an opening angle in the range of 20° to 60°, a particularly homogeneous lubricant distribution can be achieved, because even highly viscous lubricants can enter or be introduced homogeneously over the length of the lubrication groove in the radial direction out-wards through the opening into the gap to be lubricated with such a design. With an opening angle in the range of 30° to 50°, the cross-section of the lubrication groove has a particularly low notch effect, so that a particularly high mechanical strength of the fastening element can be achieved.

Preferably, the ratio of the minimum diameter of the lubrication groove, in particular the bottom portion thereof, to the diameter of the support surface is in a range of 0.8 to 0.98, preferably in a range of 0.85 to 0.95 and more preferably in a range of 0.88 to 0.92. The minimum diameter of the lubrication groove is measured in particular by those parts or regions of the lubrication groove which are closest to the longitudinal axis. In particular, this is the bottom portion of the lubrication groove. For determining the ratio, the diameter of the support surface is in particular the average diameter of the support surface along the longitudinal axis of the fitting portion. A ratio of diameters in the range of 0.8 to 0.98 results in a particularly high degree of homogeneity of the lubricant within the lubrication groove and within the gap to be lubricated. In other words, a particularly large amount of lubricant can be absorbed at this ratio, so that a particularly long lubrication life can be achieved hereby. A diameter ratio in the range of 0.85 to 0.95 results in a fitting portion which has a particularly low degree of notch effect. This is particularly crucial because high notch effects have a great influence on the mechanical strength of the fastening element, especially under bending loads. Therefore, a diameter ratio in the range of 0.85 to 0.95 results in a particularly mechanically loadable fastening element. A diameter ratio in the range from 0.88 to 0.92 results in a fitting portion which is particularly easy to manufacture, in particular by cold forming. A particularly cost-effective fastening element can therefore be achieved.

Advantageously, the support surface fraction of the fitting portion is in a range of 0.3 to 0.9 and/or 0.8, preferably in a range of 0.4 to 0.7 and more preferably in a range of 0.5 to 0.65. The support surface fraction of the fitting portion is that part which is attributable to the load-bearing surface. For example, this fraction may be determined by subtracting from the total surface area of the fitting portion the parts of the surface area formed by the lubrication groove or by the opening of the lubrication groove. In other words, the support surface fraction may be determined by projecting, on a cylinder just surrounding the fitting portion, the lubrication grooves and the support surfaces, and then determining the fraction of the surface of the cylinder which is formed or covered by the projection of the support surface. With a support surface fraction of the fitting portion in the range of 0.3 to 0.9 and/or 0.8, a particularly high load-bearing capacity of the fastening element or of the fitting portion can be achieved, because a particularly high level of forces and moments can be absorbed by the support surface as a result. A support surface fraction in the range of 0.4 to 0.7 results in a support surface which is particularly easy to manufacture. With a support surface fraction of 0.5 to 0.65, a particularly good lubricant conduction can be achieved, because a large part of the fitting portion is formed by lubrication grooves in this type of design.

Preferably, a lubricant, in particular a lubricating grease or a lubricating oil, is provided or introduced in at least one lubrication groove. By providing lubricant, a particularly simple lubrication can be achieved.

Advantageously, the fastening element is manufactured by cold forming. By manufacturing the fastening element by means of cold forming, a positive material influence is achieved, because cold forming leads to a mechanical hardening of the material, so that a cold-formed fastening element is significantly more mechanically resistant compared to a fastening element that has not been cold-formed.

Advantageously, the fitting portion forms an end portion in particular in the direction of the longitudinal axis of the fastening element. By designing the fitting portion as an end portion, a particularly simple manufacturing of the fastening element can be achieved. By an end portion it is to be understood that the fitting portion forms the last distal region of the fastening element, in particular in the direction of the longitudinal axis.

Alternatively, preferably, a stop portion may also extend behind the fitting portion when viewed in the direction of the longitudinal axis. By providing a stop portion, it is possible to positively prevent the possible relative movement between the fastening element and the mounting part in the direction of the longitudinal axis. For example, such a stop portion may be formed by a radially protruding stop. Advantageously, this radially protruding projection (stop portion) thereby extends annularly around the longitudinal axis.

Preferably, the fixing portion has fixing structures in the form of an internal and/or external thread. By providing an internal and/or external thread, a particularly simple assembly can be achieved. Alternatively or additionally preferably, the fixing portion may also comprise a tool engagement contour, such as an external hex, an internal hex or an internal hex round. This can in particular further simplify the assembly of the fastening element, because the provision of the tool engagement contour can avoid the use of further clamping tools for assembly.

Advantageously, the fixing portion forms an end portion, in particular in the direction of the longitudinal axis of the fastening element. Providing the fixing portion as an end portion results in a geometry that is particularly easy to manufacture, because in particular during forming, areas that lie in the end portions can be more easily machined with a large degree of forming. Therefore, providing the fixing portion in an end region or in an end portion of the fastening element results in a fastening element that is particularly easy and inexpensive to manufacture.

Another aspect of the invention relates to a mounting system comprising a fastening element, in particular a fastening element as described above and below, and a mounting part, wherein the mounting part comprises a receptacle, wherein the fastening element comprises a fitting portion, wherein the fitting portion extends or is adapted to extend at least partially into the receptacle, wherein the receptacle and the fitting portion have a clearance fit with respect to each other. In other words, the mounting element may have the above-described properties and features of the fastening element, particularly with respect to the fitting portion. Alternatively preferably, the mounting element may be configured such that no lubrication grooves are present in the fitting portion. In such an embodiment, however, it is at least advantageous according to the invention if the receptacle of the mounting part comprises a lubrication groove. In this respect, this lubrication groove of the mounting part can be configured in such a way that it can have the above-described properties and characteristics of the lubrication groove of the fastening element. In other words, this may mean that the properties and features of the lubrication groove described herein may also be realized in the lubrication groove of the mounting part. It is particularly preferred that both the fastening element and the mounting part comprise a lubrication groove in the form of a lubrication helix, if these two lubrication helices are formed in opposite directions to each other. In this way, it can be achieved that the lubrication helices of the fastening element are prevented from catching on the lubrication helices of the mounting part. The receptacle of the mounting part is in particular a recess which is advantageously formed complementary to the outer contour of the fitting portion of the fastening element. Therein, these portions which are contrarily formed with respect to one another are in particular formed as a clearance fit with respect to one another.

In other words, this can mean that the fastening element with its fitting portion can theoretically be inserted into the receptacle of the mounting part without contact. By means of the mounting system according to the invention, it can be achieved by means of the lubrication grooves—in the mounting part, in particular in its receptacle, and/or in the fitting portion of the fastening element—that lubrication and thus a friction reduction in the gap between the mounting part and the fastening element is achieved in an efficient manner.

Advantageously, the receptacle of the mounting part is filled with a lubricant and/or a lubricant or a lubricating means is present in the receptacle. By introducing a lubricant into the receptacle, the receptacle acts as a kind of reservoir for providing the lubricant. Furthermore, it can also be achieved hereby that with each relative movement between the fastening element and the mounting part, lubricant can be introduced or conveyed into the lubrication groove or grooves by this movement.

Advantageously, the fitting portion of the fastening element is freely movable relative to the receptacle in the direction of the longitudinal axis in an assembled state. In other words, the fitting portion is not designed such that it can positively or non-positively prevent relative movement between the fastening means and the receptacle in the direction of the longitudinal axis. In other words, therefore, the fitting portion may in particular be designed, inter alia, to be non-threaded.

Expediently, the fitting portion has an outer supporting surface, wherein at least one lubrication groove is provided in the fitting portion, wherein the lubrication groove is designed such that, upon movement of the fastening element in the direction of the longitudinal axis, the support surface and/or the part of the receptacle of the mounting part which makes contact and/or can make contact with the fitting portion can be wetted with lubricant through the lubrication groove. In other words, this may mean that the lubrication groove is arranged and/or configured in such a way that it can wet the support surface or the part of the receptacle which makes contact with the support surface with lubricant, in particular completely in the direction of the longitudinal axis and circumferentially around the longitudinal axis, by means of a longitudinal movement of the fastening element. In this way, a particularly good and homogeneous lubricant distribution can be achieved. Such a formation of the lubrication groove can be achieved, for example, by a lubrication helix. In other words, the lubrication groove can therefore be a lubrication helix.

In an advantageous embodiment, the mounting part is a brake caliper or a part of a brake caliper. This can prevent the brake caliper from seizing up, in particular due to the lubricant supply through the lubrication groove, so that the service life of the brake caliper and of the entire brake system can be increased.

Another aspect of the invention relates to a manufacturing method for a fastening element, in particular according to one of the preceding embodiments, wherein the fastening element has a fitting portion with a lubrication groove and a support surface, the manufacturing method comprising the steps of: Providing a blank; Machining the blank, in particular by cold forming, wherein the machining or the cold forming in particular creates the lubrication groove. The manufacturing method may in particular comprise the steps of machining the blank to create the fitting portion—with the lubrication groove—and the support surface. By means of the manufacturing process according to the invention, a fastening element can be manufactured at low cost. Processing the blank by cold forming results in a fastening element that can be subjected to particularly high mechanical loads. The cold forming of the blank is carried out, in particular, in such a way that, in the manufacturing process, a die and a punch are moved relative to one another in the direction of the longitudinal axis of the fastening element. Therein, the cold forming of the blank can take place both in one working step and in several, staged, successive cold forming steps. Advantageously, the fixing structures or structures of the fixing portion, in particular in the form of threads, are produced directly during cold forming. This results in a particularly inexpensive production of the fastening element. Alternatively, preferably, the thread (or threads) is produced in a separate subsequent rolling pass. In this way, a particularly precise production of the thread can be achieved.

Preferably, in particular after cold forming, the support surface of the fitting portion is calibrated, in particular by rolling. By calibrating the support surface in this way, a particularly flat or cylindrical support surface can be achieved. Additionally, preferably, this calibration can also achieve that the openings of the lubrication grooves are tapered. This can, among other things, make it more difficult for the lubricant to escape from the lubrication groove. Advantageously, this calibration is carried out by rolling, because in this way a particularly cost-effective calibration with particularly narrow tolerance classes, in particular IT 4 to IT7, can be achieved. Advantageously, this calibration step takes place after the forming or cold forming of the workpiece blank and can therefore be regarded as a kind of finishing step.

Figure 2:
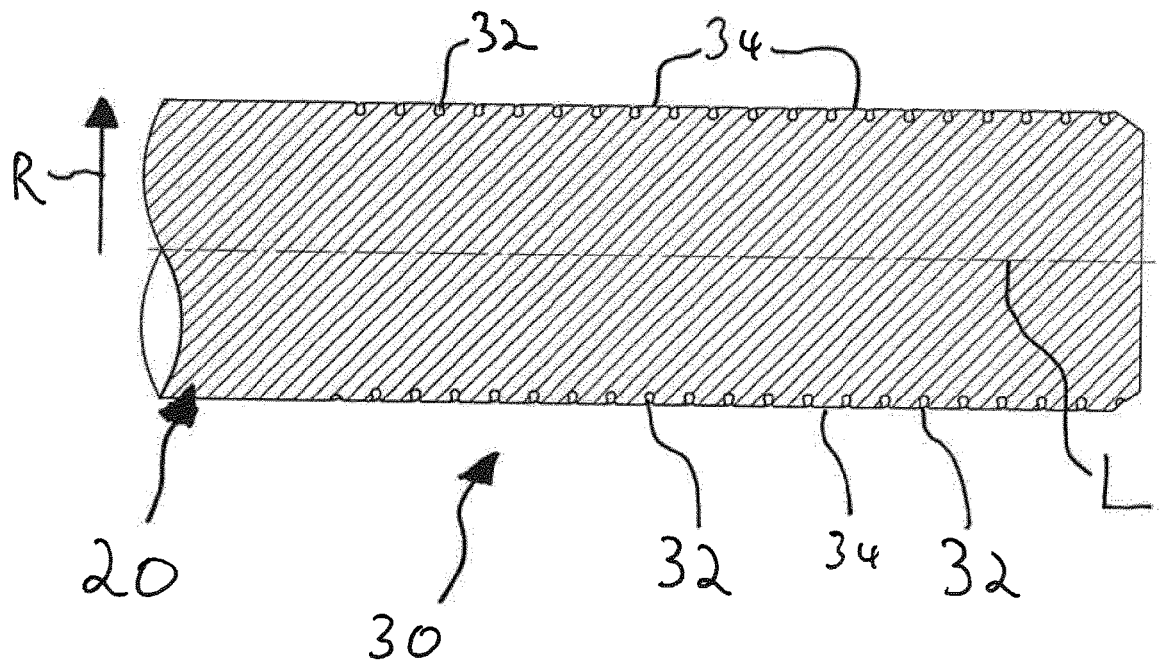
Figure 3:
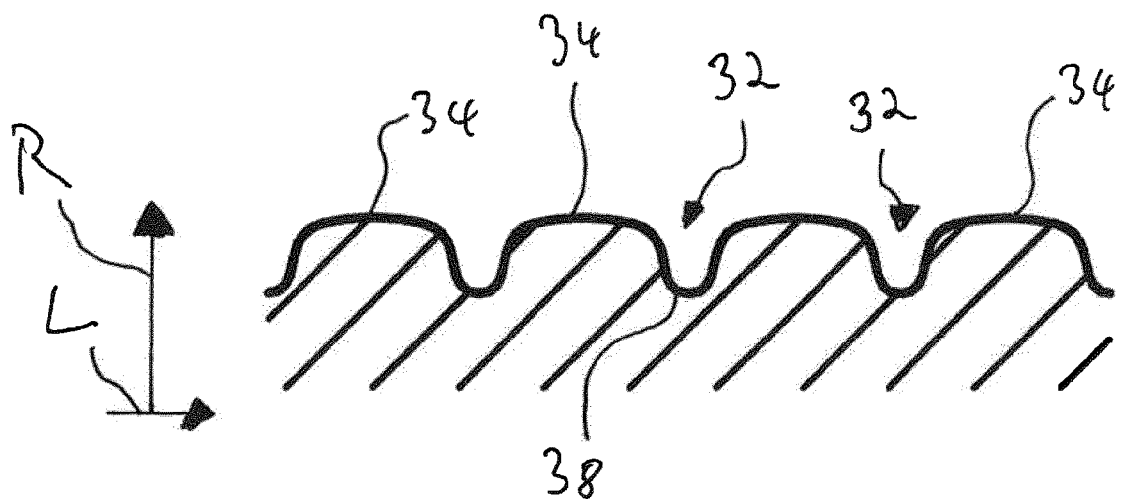

Further advantages and features of the present invention will be apparent from the following description with reference to the figures. Individual features of the embodiment shown can also be used in other embodiments, unless this has been expressly excluded. It is shown in:

FIG. 1—A section through a mounting system with a fastening element;

FIG. 2—A detailed view of part of a fastening element;

FIG. 3—A detailed view of a section through part of the fitting portion; and

Figure 4:
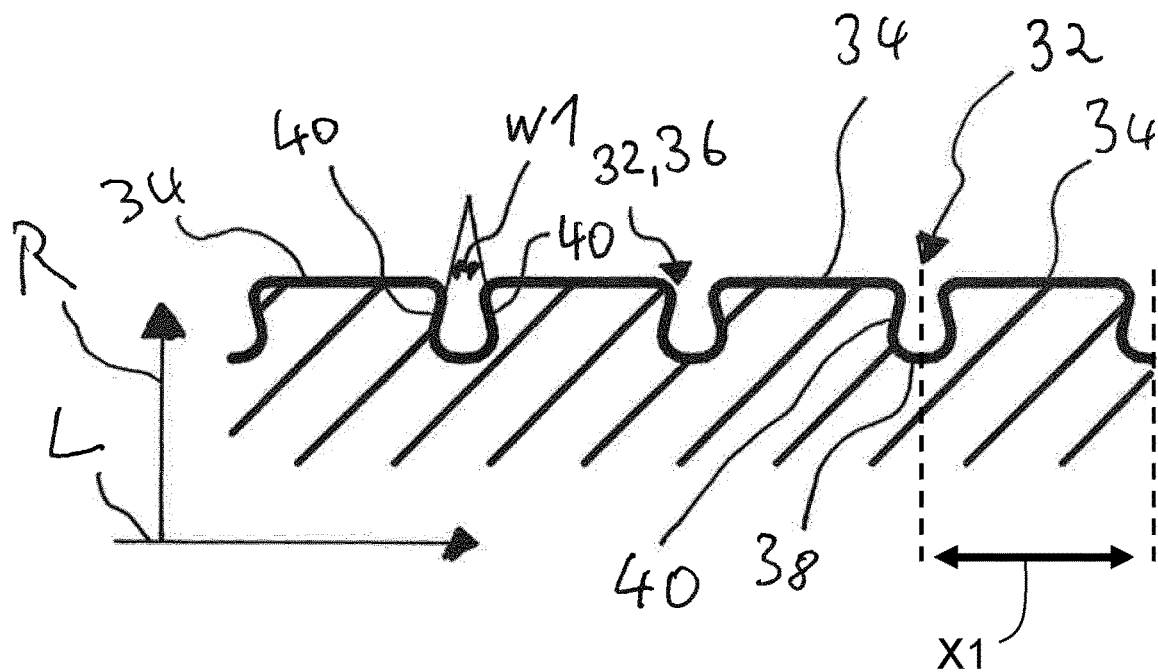

FIG. 4—A further detailed view of a section through a fitting portion of a fastening element.

Figure 5:
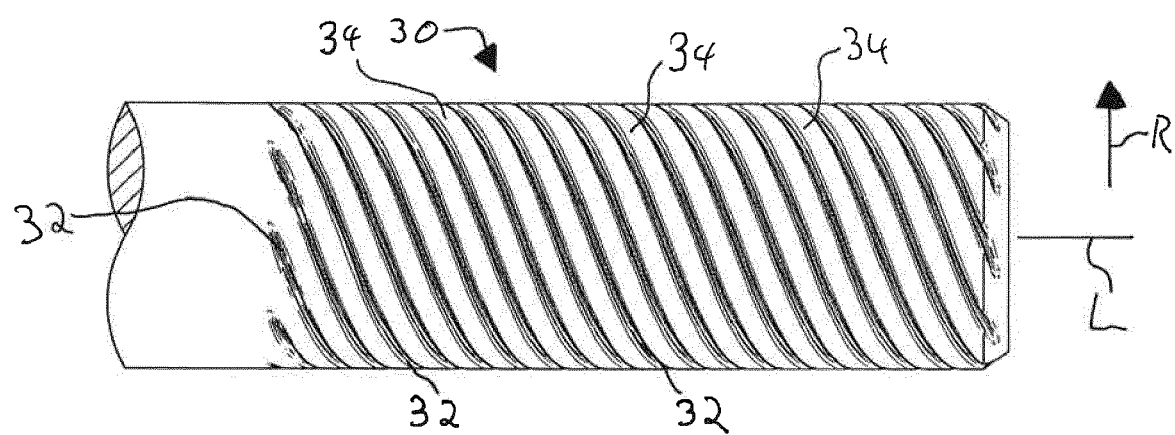

FIG. 5—A further detailed view of a part of a fastening element

FIG. 1 shows a mounting system comprising a fastening element 1, a mounting part 100 and a fixing part 200. The fixing part 200 is indirectly fixedly connected to the fixing portion 10 of the fastening element 1. For this purpose, the fixing portion 10 has fixing structures in the form of an internal thread. The fastening element 1 extends along the longitudinal axis L, wherein the fixing portion 10 and the fitting portion 30 each form end portions of the fastening element 1 in the direction of the longitudinal axis L.

Between the fixing portion 10 and the fitting portion 30, the intermediate portions 20 of the fastening element 1 extends. The fitting portion 30 of the fastening element 1 has a lubrication groove 32 which is in the form of a lubrication helix and extends spirally around the longitudinal axis L on the outside of the fitting portion 30. Between the individual lubrication grooves 32, or in the space between two adjacent fractions of the lubrication groove 32, is the support surface 34, which serves to make direct contact with the receptacle 110 of the mounting portion 100. By providing the lubrication groove 32 in the fitting portion 30 of the fastening element 1, it is achieved that lubricant can be introduced in an efficient manner in the gap between the receptacle 110 and the fitting portion 30. To achieve relative movement between the fitting portion 30 and the receptacle 110, both the fitting portion 30 and the receptacle 110 have a clearance fit.

FIG. 2 shows a detailed view of a part of the fastening element 1. In principle, the detail portion of the fastening element 1 shown in FIG. 2 may match the fastening element 1 shown in FIG. 1. In FIG. 2, it can be seen that the fastening element 1 has both an intermediate portion 20 and a fitting portion 30. In particular, the fastening element 1 extends along the longitudinal axis L, with the radial direction R extending radially with respect to this longitudinal axis L. On the outer surface in the direction of the radial direction R of the fitting portion 30, the support surface 34 is arranged or located, which serves to absorb forces and transmit loads or mechanical forces between the fastening element 1 and a mounting part 100. As can be seen from FIG. 2, a lubrication groove 32 extends on the outer surface of the fitting portion 30. In principle, not only one lubrication groove 32 can be provided, but a plurality of lubrication grooves 32. For example, these lubrication grooves 32 can be formed as lubrication helices 32 or also as lubrication rings 32.

FIG. 3 shows a detailed view of a section through the fitting portion 30. As can be seen from FIG. 3, a support surface 34 extends between each of two lubrication grooves 32, in particular as viewed in the longitudinal direction L. These lubrication grooves 32 have a bottom portion 38. In the situation illustrated in FIG. 3, the course of the support surface 34 is in each case arcuate. For example, such a design results in particular when no calibration of the support surface 34 takes place.

FIG. 4 also shows a detailed view of a section of a fitting portion 30. The situation illustrated in FIG. 4 is a fastening element 1 whose support surface 34 has been calibrated by rolling. For example, a situation such as that illustrated in FIG. 4 is achievable by calibrating the situation illustrated in FIG. 3. As can be seen from the comparison of FIG. 3 and FIG. 4, a significant change in the design of the lubrication grooves 32 and the support surface 34 can be achieved by this calibration. In the embodiment shown in FIG. 4, the lubrication groove 32 is designed in such a way that it has a rounded bottom portion 38, which is adjoined by connecting portions 40, which are designed to taper in an arrow shape in the radial direction R. These connecting portions 40 have an opening angle W1 with respect to one another. In radial direction R, the lubrication groove 32 is designed to be closed by the opening 36. As can be seen from FIG. 4, the opening 36 has a smaller extension in the direction of the longitudinal axis L than the bottom portion 38 of the lubrication groove 32. This tapered design of the lubrication groove 32 in the radial direction R can prevent or at least reduce uncontrolled lubricant leakage from the lubrication groove 32. In FIG. 4, the adjacent lubrication grooves 32 are spaced apart from one another by a distance X1 in the direction of the longitudinal axis L.

FIG. 5 shows an external view of the fitting portion 30. As can be seen from FIG. 5, a support surface 34 extends between each of two lubrication grooves 32, in particular as seen in the longitudinal direction L. These lubrication grooves 32 have a bottom portion 38. In the situation illustrated in FIG. 5, the course of the support surface 34 between two lubrication grooves 32 is in each case spiral, because the lubrication grooves 32 themselves are designed as lubrication helices 32. In the fitting portion 30, there are a plurality of lubrication helices 32 which are formed around the longitudinal direction L in a manner similar to a multi-start thread.

LIST OF REFERENCE SIGNS

1—fastening element
10—fixing portion
20—intermediate portion
30—fitting portion
32—lubrication groove
34—support surface
36—opening
38—bottom portion
40—connecting portion
100—mounting part
110—receptacle
200—fixing part
L—longitudinal axis
R—radial direction
W1—opening angle
X1—distance between two adjacent lubrication grooves in the direction of the longitudinal axis

The invention claimed is:

1. A fastening element (1), in particular mounting bolt, comprising a fixing portion (10), an intermediate portion (20) and a fitting portion (30),
   wherein the fastening element (1) extends along a longitudinal axis (L),
   wherein the fixing portion (10) comprises fixing structures, in particular a thread,
   wherein the intermediate portion (20) is arranged in the direction of the longitudinal axis (L) between the fixing portion (10) and the fitting portion (30),
   wherein the fitting portion (30) is substantially rotationally symmetrical about the longitudinal axis (L),
   wherein the fitting portion (30) has an outer support surface (34),
   wherein the support surface (34) has a clearance fit,
   wherein at least one lubrication groove (32) is provided in the fitting portion (30), wherein the ratio of the minimum diameter of the lubrication groove (32), in particular a bottom portion (38) thereof, to the diameter of the support surface (34) is in a range of 0.80 to 0.98,
   wherein the cross-section of the lubrication groove (32) has an opening (36) facing in a radial direction (R), and
   wherein the opening (36) has a smaller extension than the bottom portion (38).

2. The fastening element (1) according to claim 1,
   wherein at least one lubrication groove (32) is designed in such a way that, during a movement of the fastening element (1) in the direction of the longitudinal axis (L), the support surface (34) can be wetted with lubricant through the lubrication groove (32).

3. The fastening element (1) according to claim 1,
wherein at least one lubrication groove (32) is a lubrication helix (32).

4. The fastening element (1) according to claim 1,
wherein the lubrication groove (32) has a pitch in the direction of the longitudinal axis (L),
wherein the pitch of the lubrication groove (32) to the diameter of the support surface (34) is in a range of 0.03 to 0.4.

5. The fastening element (1) according to claim 1,
wherein the support surface (34) is cylindrical about the longitudinal axis (L).

6. The fastening element (1) according to claim 1,
wherein the bottom portion (38) is in particular rounded.

7. The fastening element (1) according to claim 1,
wherein the smaller extension is in the direction of the longitudinal axis (L).

8. The fastening element (1) according to claim 1,
wherein the ratio of the minimum diameter of the lubrication groove (32), in particular the bottom portion (38) thereof, to the diameter of the support surface (34) is in a range of 0.85 to 0.95.

9. The fastening element (1) according to claim 1,
wherein the support surface fraction of the fitting portion (30) is in a range of 0.3 to 0.8.

10. A mounting system comprising a fastening element (1) according to claim 1 and a mounting part (100),
wherein the fastening element (1) extends in particular along a longitudinal axis (L),
wherein the mounting part (100) comprises a receptacle (110),
wherein the fastening element (1) has a fitting portion (30),
wherein the fitting portion (30) extends or is adapted to extend at least partially into the receptacle (110),
wherein the receptacle (110) and the fitting portion (30) have a clearance fit with respect to each other.

11. The mounting system according to claim 10,
wherein the fitting portion (30) of the fastening element (1) is freely movable relative to the receptacle (110) in the direction of the longitudinal axis (L) in an assembled state.

12. The mounting system according to any one of claim 10,
wherein the fitting portion (30) has an outer support surface (34),
wherein at least one lubrication groove (32) is provided in the fitting portion (30),
wherein the lubrication groove (32) is designed such that, upon movement of the fastening element (1) in the direction of the longitudinal axis (L), the support surface (30) and/or the part of the receptacle (110) of the mounting part (100) which makes contact and/or can make contact with the fitting portion (30) can be wetted with lubricant through the lubrication groove (32).

13. The mounting system according to any one of claim 10,
wherein the mounting part (100) is a part of a brake caliper.

14. A manufacturing method for a fastening element (1) according to claim 1,
wherein the fastening element has a fitting portion (30) with a lubrication groove (32) and a support surface (34),
comprising the steps:
providing a blank,
cold forming the blank, the cold forming creating in particular the lubrication groove (32);
wherein, in particular after cold forming, the support surface (34) of the fitting portion (30) is rolled.

* * * * *